US011438802B2

(12) United States Patent
Hoewisch (10) Patent No.: US 11,438,802 B2
(45) Date of Patent: Sep. 6, 2022

(54) METHOD AND SYSTEM FOR QUALITY-OF-SERVICE AUTHORIZATION BASED ON TYPE OF RADIO ACCESS TECHNOLOGY AND OTHER DATA SESSION ATTRIBUTES

(71) Applicant: Aeris Communications, Inc., San Jose, CA (US)

(72) Inventor: Ethan Hoewisch, San Jose, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

(21) Appl. No.: 17/104,526

(22) Filed: Nov. 25, 2020

(65) Prior Publication Data

US 2021/0160736 A1 May 27, 2021

Related U.S. Application Data

(60) Provisional application No. 62/941,070, filed on Nov. 27, 2019.

(51) Int. Cl.
*H04W 28/12* (2009.01)
*H04W 28/02* (2009.01)
(Continued)

(52) U.S. Cl.
CPC ......... *H04W 28/12* (2013.01); *H04L 61/6054* (2013.01); *H04M 15/66* (2013.01);
(Continued)

(58) Field of Classification Search
CPC ................. H04M 15/66; H04M 15/81; H04M 15/8016; H04M 15/725; H04M 15/8027;
(Continued)

(56) References Cited

U.S. PATENT DOCUMENTS 8,086,216 B2   12/2011   Feder
8,300,575 B2   10/2012   Willars
(Continued)

FOREIGN PATENT DOCUMENTS

EP          2521305 B1 *  9/2017  ............ H04L 12/14
WO   WO-2013064004 A1 *  5/2013  ............ H04W 28/24
(Continued)

OTHER PUBLICATIONS

Copeland et al., "Controlling enterprise context-based session policy and mapping it to mobile broadband policy rules", 2012 16th International Conference onIntelligence in Next Generation Networks, pp. 194-201, Retrieved at http://servicearchitecture.wp.imtbs-tsp.eu/files/2013/08/120820-Controlling-Enterprise-Context-Based-Session-Policy-and-Mapping.pdf, Oct. 8, 2012.
(Continued)

*Primary Examiner* — Mehmood B. Khan
(74) *Attorney, Agent, or Firm* — Brundidge & Stanger, P.C.

(57) ABSTRACT

A computer-implemented system and method for automated traffic flow control using quality of service authorization based on type of radio access technology and other parameters for one or more devices enabled for connectivity over cellular network are disclosed. The computer-implemented method includes receiving credit control request for the one or more devices from a subscriber; receiving quality of service (QoS) configuration authorized for the one or more devices for the subscriber from a configuration database; combining the authorized QoS parameters for the subscriber; comparing them against the requested QoS by the subscriber; and updating charging rules for the subscriber as an answer to the credit control request.

21 Claims, 8 Drawing Sheets

(51) Int. Cl.
*H04W 4/24* (2018.01)
*H04W 84/04* (2009.01)
*H04M 15/00* (2006.01)
*H04L 101/654* (2022.01)

(52) U.S. Cl.
CPC ......... *H04W 4/24* (2013.01); *H04W 28/0257* (2013.01); *H04W 28/0268* (2013.01); *H04W 84/042* (2013.01)

(58) Field of Classification Search
CPC ......... H04M 15/8022; H04M 15/8033; H04M 15/8228; H04W 28/0257; H04W 28/12; H04W 28/0268; H04W 4/24; H04L 61/6054; H04L 12/1407
See application file for complete search history.

(56) References Cited

U.S. PATENT DOCUMENTS

| | | | |
|---|---|---|---|
| 8,353,000 | B2 | 1/2013 | He |
| 8,355,413 | B2 | 1/2013 | Vasamsetti |
| 8,601,125 | B2 | 12/2013 | Huang |
| 9,198,075 | B2 | 11/2015 | Raleigh |
| 2005/0152270 | A1 | 7/2005 | Gomez Paredes |
| 2012/0026947 | A1* | 2/2012 | Miller .................... H04W 28/24 370/329 |
| 2012/0195196 | A1 | 8/2012 | Ghai |
| 2018/0068358 | A1* | 3/2018 | Hoffberg ............. G07F 17/3237 |
| 2018/0176928 | A1* | 6/2018 | Wang .................... H04W 64/00 |
| 2019/0268808 | A1* | 8/2019 | Mathison ........... H04W 28/0268 |
| 2020/0195981 | A1* | 6/2020 | Chiaverini ............ H04W 8/205 |
| 2020/0259960 | A1* | 8/2020 | Salgueiro ................ H04W 8/20 |

FOREIGN PATENT DOCUMENTS

| | | | | |
|---|---|---|---|---|
| WO | WO-2018224122 | A1 | * | 12/2018 |
| WO | WO-2019016389 | A1 | * | 1/2019 |
| WO | WO-2020119954 | A1 | * | 6/2020 ........ H04W 28/0268 |

OTHER PUBLICATIONS

Maniatis et al., End-to-end QoS specification issues in the converged all-IP wired and wireless environment, IEEE Communications Magazine 42, No. Jun. 14, 2004: 80-86, Retrieved at https://www.academia.edu/download/39630565/End-to-end_QoS_specification_issues_in_t20151103-1858-ih5986.pdf.

* cited by examiner

Flows R Important

METHOD AND SYSTEM FOR QUALITY-OF-SERVICE AUTHORIZATION BASED ON TYPE OF RADIO ACCESS TECHNOLOGY AND OTHER DATA SESSION ATTRIBUTES

CROSS-REFERENCE TO RELATED APPLICATIONS

Under 35 USC 119(e), this application claims priority to U.S. provisional application Ser. No. 62/941,070, entitled "METHOD AND SYSTEM FOR QUALITY OF SERVICE AUTHORIZATION BASED ON TYPE OF RADIO ACCESS TECHNOLOGY", filed on Nov. 27, 2019, all of which is herein incorporated by reference in its entirety.

FIELD OF THE INVENTION

The present invention relates generally to controlling the flow of subscriber's traffic using quality of service authorization based on the type of radio access technology and other data session attributes for devices enabled for connectivity over cellular or wireless networks.

BACKGROUND OF THE INVENTION

An increasing number of devices, whether telematics equipment, sensors, tablets, phones or other types of hardware, known as machine-to-machine (M2M) or Internet of Things (IoT) devices, are enabled to connect to networks, such as wireless or cellular networks, for sending or receiving data by use with products such as Subscriber Identification Modules (SIMs). As IoT solutions are being deployed in high volume, network operators have the concern of managing Internet Protocol filter rules for subscribers' traffic in order to drop packets sent to certain ports, or apply a high-priority quality of service to packets sent to or from an Internet Service Provider's streaming video service. Accordingly, what is needed are systems and/or methods to address the above identified issues. The present invention addresses such a need.

SUMMARY OF THE INVENTION

A computer-implemented system, method and computer program product for controlling the flow of subscriber's traffic using quality of service authorization based on type of radio access technology and other data session attributes for one or more devices enabled for connectivity over cellular or wireless networks are disclosed. In an embodiment, the computer-implemented method for automated traffic flow control using quality of service authorization based on type of radio access technology and other data session attributes for one or more devices enabled for connectivity over cellular or wireless networks includes receiving credit control request for the one or more devices from a subscriber; receiving quality of service (QoS) configuration authorized for the one or more devices for the subscriber from a configuration database; combining the authorized QoS parameters for the subscriber; comparing them against the requested QoS by the subscriber; and updating charging rules for the subscriber as an answer to the credit control request.

In an embodiment, the system for automated traffic flow control using quality of service authorization based on type of radio access technology and other data session attributes comprises one or more devices enabled for connectivity, a policy and charging rules function software node (PCRF), wherein the PCRF: receives credit control request for the one or more devices from a subscriber; receives quality of service (QoS) configuration authorized for the one or more devices for the subscriber from a configuration database; combines the authorized QoS parameters for the subscriber; compares them against the requested QoS by the subscriber; and updates charging rules for the subscriber as an answer to the credit control request.

In an embodiment, the computer program product for automated traffic flow control using quality of service authorization based on type of radio access technology and other data session attributes for one or more devices enabled for connectivity over cellular or wireless networks, having computer readable instructions for causing a computer to control an execution of an application for traffic flow control using radio access technology type-based quality of service authorization for one or more devices enabled for connectivity including receiving credit control request for the one or more devices from a subscriber; receiving quality of service (QoS) configuration authorized for the one or more devices for the subscriber from a configuration database; combining the authorized QoS parameters for the subscriber; comparing them against the requested QoS by the subscriber; and updating charging rules for the subscriber as an answer to the credit control request.

DETAILED DESCRIPTION OF THE PREFERRED EMBODIMENTS

The present invention relates generally to automated traffic flow control using quality of service authorization based on type of radio access technology and other data session attributes for one or more devices enabled for connectivity over cellular or wireless network.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Although the invention is described with respect to a product including a connectivity module, as used herein the term "product" is intended to be inclusive, interchangeable, and/or synonymous with telematics equipment, sensors, appliances, electronic modules, telephony equipment and other similar products that are enabled for connectivity to wireless or cellular networks and that require registration for that product of distinct identifying numbers, such as Integrated Circuit Card Identifiers (ICCIDs), International Mobile Subscriber Identities (IMSIs), Mobile Equipment Identifiers (MEIDs) or other serial numbers as described further below and collectively referred to herein as "numbers", with a service provider to receive services, one will recognize that functionally different types of products may have characteristics, functions and/or operations which may be specific to their individual capabilities and/or deployment.

An increasing number of devices, whether telematics equipment, sensors, tablets, phones or other types of hardware, known as machine-to-machine (M2M) or Internet of Things (IoT) devices, are enabled to connect to networks, such as wireless or cellular networks, for sending or receiving data by use with products. As IoT solutions are being deployed in high volume, network operators have the concern of managing Internet Protocol filter rules for subscribers' traffic in order to drop packets sent to certain ports, or apply a high-priority quality of service to packets sent to or from an Internet Service Provider's streaming video service. This process may not be performed by humans efficiently at high volumes. Accordingly, what is needed are systems and/or methods to automatically address the above identified issues. The present invention addresses such a need.

Generally, a policy and charging rules function (PCRF) is designed to control access of and actions by IoT devices based on their service profile. For example, the PCRF can allow packet data transmission, cause a packet data session to drop, assign a charging code to traffic, and/or apply a Quality of Service (QoS) policy. The PCRF can be configured to apply special traffic charging rules to devices having a specific service profile, such as applying specific rules for specific scenarios, for example, not counting data packets associated with traffic to or from a specific IP address against a subscriber's data plan.

The network provider may implement the PCRF to store in a database a service profile for a set of cellular devices, which service profile lists the authorizing Quality of Service (QoS) parameters, and configure the PCRF to consult the service profile and the data in this database to determine what actions to take and rules to apply for each IP packet observed by the PCRF as being from or to one such cellular device. Typically, the PCRF may not observe the subscribers' IP packets, which may be the responsibility of the PCEF. Whether or not the PCRF is implemented or deployed as part of the same computer program product as the Policy and Charging Enforcement Function (PCEF) is up to the implementor and/or the operator of the PCRF and/or PCEF, which may be the network operator.

The network provider typically may associate each cellular device with the entity responsible for paying the network provider to provide network service to that cellular device. These entities responsible for paying the network provider to provide network service to that cellular device are known as customers. An exemplary way of making this association is to associate the customer with a unique numeric account identifier (or account ID), and store a database record for the cellular device such that it contains the customer's account ID.

The network provider typically may provide differentiated service to customers by creating different service plans within the customer's account. For example, a customer way wish for one set of their devices to only receive cellular service within the United States of America, and for another set of devices to only receive cellular service within Canada. An exemplary way of creating these service plans is to associate each with a unique numeric identifier (or service code), and store a database record for the cellular device such that, when the device is provisioned, the database record contains the service code to which the device is associated.

The network provider typically may implement the PCRF that would only authorize a single, static set of Quality of Service (QoS) parameters for any given charging rule. A charging rule defines how the Policy and Charging Enforcement Function (PCEF) should handle a subscriber's traffic that matches a set of Internet Protocol filter rules, for example, dropping packets sent to a certain port, or applying a high-priority quality of service to packets sent from or to an ISP's streaming video service etc. The set of QoS parameters the PCRF assigns to each charging rule is configured in advance, but cannot be modified at run-time to account for difference subscriber access scenarios.

This may be problematic for cellular devices on radio access technology (RAT) types that do not allow the creation of alternate bearers. If the QoS parameters authorized by the PCRF do not match the QoS parameters associated with the subscriber's bearer, and the cellular network does not support having the network control the subscriber's bearer(s), the PCEF may not install the network provider's desired charging rules. If the network provider's desired charging rules are not installed, the network provider's policies will not be enforced, for example, dropping packets sent to a certain port, or applying a high-priority quality of service to packets sent from or to an internet service provider's (ISP's) streaming video service etc.

A naïve implementation of a dynamic Quality of Service (QoS) authorization—such that the authorized QoS does not cause unnecessary bearer creation—would be to use the requested QoS parameters in each charging rule install Attribute Value Pair (AVP). However, this could consume a prohibitive amount of resources in network provider's equipment if subscriber devices request, e.g., guaranteed bitrates.

The network provider therefore may authorize QoS parameters in order to constrain a subscriber's cellular data session to a certain level of resource utilization, and in order to match the QoS parameters that their cellular roaming partners approve.

To enable traffic control through use of radio access technology (RAT) type and other data session attributes-based quality of service (QoS) as input from Credit Control Requests (CCR), the PCRF may take any one or more of the following pieces of information: Radio Access Technology (RAT) type; and any one or more of other data session attributes including but not limited to: visited Public Land Mobile Network (PLMN); International Mobile Subscriber Identifier (IMSI); the subscriber's Bearer Control Mode; the time of day that the CCR was issued; and requested QoS parameters including but not limited to Allocation and Retention Priority (ARP), Quality of Service Class Identifier (QCI), maximum uplink bitrate, maximum downlink bitrate, etc.

The PCRF may derive, from pieces of information from the CCR, attributes such as the subscriber's account ID; and the subscriber's service code. The PCRF may perform this derivation by, for example, looking up a database record identified by the subscriber's IMSI.

The PCRF may also take the following pieces of information from a configuration database such as authorized QoS parameters relevant to the attributes and derived attributes of the CCR, for example, any one or more of: maximum allowed ARP, maximum allowed QCI, maximum allowed uplink bitrate, maximum allowed downlink bitrate, etc.; and authorized QoS parameters for the specific charging rule, for example, any one or more of: maximum allowed ARP, maximum allowed QCI, maximum allowed uplink bitrate, maximum allowed downlink bitrate, etc.

With this information, the PCRF combines the authorized QoS parameters and compares them against the requested QoS. The comparison is based on the QCI, ARP, and bitrates of the requested and authorized QoS. For comparing QCI values, the PCRF primarily uses the "priority" field of the QCI. For comparing ARP values, the PCRF uses the priority level field in conjunction with whether or not the subscriber's resources can pre-empt or be pre-empted by other resources.

Based on the comparison, and the subscriber's Bearer Control Mode, the PCRF will: 1. use the requested QoS parameters in the Charging Rule Install AVP to authorize them; 2. use the authorized QoS parameters in the Charging Rule Install AVP to "downgrade" the requested QoS into the authorized QoS; or 3. deny the subscriber admission to the network on the basis that the subscriber is not authorized for the requested QoS.

This solution allows the network provider PCRF to constrain QoS authorized for subscribers while giving network operators the flexibility to adjust for differing Radio Access Technologies and other data session attributes such as but not limited to visited countries, visited PLMNs, customer accounts, service profiles within a customer account, time of day of access, and serving APN. This solution may also allow network operators to provide other data session attributes, for example, user time zone, etc., to the evaluation criteria which are not described here. It may also make the network provider a little bit better at offering differentiated services and may allow certain features offered by the provider such as the Connection Lock feature, described in co-pending U.S. application Ser. No. 16/879,087, entitled "TRAFFIC FLOW CONTROL USING DOMAIN NAME", to work across different Radio Access Technologies.

To describe the features of the present invention in more detail within the context of IoT devices enabled to connect with wireless or cellular networks with products such as SIMs installed in them, such as telematics devices installed in vehicles or sensors, refer to the accompanying figures in conjunction with the following discussions. These examples are used for purpose of illustration only, and should not be construed as limitations.

The embodiments described herein disclose a computer-implemented method and system for automated traffic flow control using quality of service authorization based on type of radio access technology and other data session attributes for one or more devices enabled for connectivity over cellular or wireless networks.

A computer-implemented system, method and computer program product for controlling the flow of subscriber's traffic using quality of service authorization based on type of radio access technology and other data session attributes for one or more devices enabled for connectivity over cellular or wireless networks are disclosed.

In an embodiment, the computer-implemented method for automated traffic flow control using quality of service authorization based on type of radio access technology and other data session attributes for one or more devices enabled for connectivity over cellular or wireless networks includes receiving credit control request (CCR) for the one or more devices from a subscriber, for example, the policy and charging enforcement function (PCEF) sends CCRs to the policy and charging rules function (PCRF) on behalf of the subscriber; receiving quality of service (QoS) configuration authorized for the one or more devices for the subscriber from a configuration database; combining the authorized QoS parameters for the subscriber; comparing them against the requested QoS by the subscriber; and updating charging rules for the subscriber as an answer to the credit control request.

In an embodiment, the system for automated traffic flow control using quality of service authorization based on type of radio access technology and other data session attributes comprises one or more devices enabled for connectivity, a policy and charging rules function software node (PCRF), wherein the PCRF; receives credit control request for the one or more devices from a subscriber; receives quality of service (QoS) configuration authorized for the one or more devices for the subscriber from a configuration database; combines the authorized QoS parameters for the subscriber; compares them against the requested QoS by the subscriber; and updates charging rules for the subscriber as an answer to the credit control request.

In an embodiment, the computer program product for automated traffic flow control using quality of service authorization based on type of radio access technology and other data session attributes for one or more devices enabled for connectivity over cellular or wireless networks, having computer readable instructions for causing a computer to control an execution of an application for traffic flow control using radio access technology type-based quality of service authorization for one or more devices enabled for connectivity including receiving credit control request for the one or more devices from a subscriber; receiving quality of service (QoS) configuration authorized for the one or more devices for the subscriber from a configuration database; combining the authorized QoS parameters for the subscriber; comparing them against the requested QoS by the subscriber; and updating charging rules for the subscriber as an answer to the credit control request.

Figure 1:
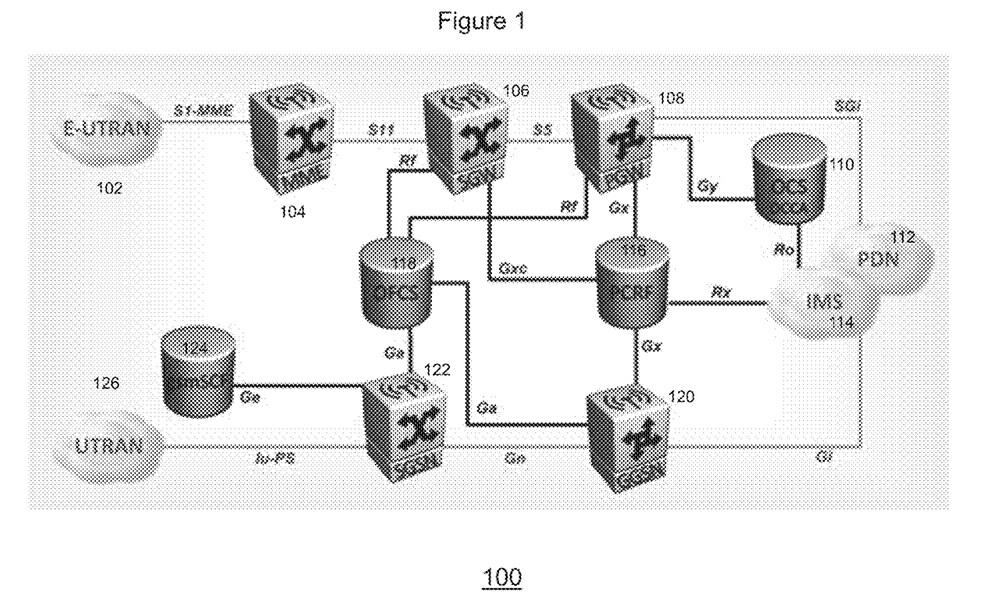
FIG. 1 illustrates an exemplary system 100 used for automated traffic flow control using quality of service authorization based on type of radio access technology and other data session attributes for one or more devices enabled for connectivity over cellular or wireless network in accordance with one or more embodiments of the present invention.

FIG. 1 illustrates an exemplary system 100 for automated traffic flow control using quality of service authorization based on type of radio access technology and other data session attributes for one or more devices enabled for connectivity over cellular or wireless network in accordance with an embodiment of the present invention. In an embodiment, the system 100 includes PCRF 116 that works in concert with serving gateway (SGW) 106, packet data gateway (PGW) 108, (LTE networks) or GGSN 120 (GSM and WCDMA networks). The PGW 108 and/or GGSN 120 include policy and charging enforcement function (PCEF) (not shown) which then enforces these charging rules.

To enable traffic control through use of quality of service authorization based on type of radio access technology and other data session attributes for one or more devices enabled for connectivity, the quality of service profile of a device stored in the PCRF 116 may list QoS configuration associated with that device and/or that subscriber. The PCRF 116 may take any one or more of the following pieces of information as input from credit control requests: radio access technology (RAT) type, and any one or more of other data session attributes including but not limited to: visited public land mobile network (PLMN), international mobile subscriber identifier (IMSI), the subscriber's bearer control mode, and requested QoS parameters such as allocation and retention priority (ARP), quality of service class identifier (QCI), maximum uplink bitrate, and maximum downlink bitrate. The PCRF may derive, from pieces of information from the CCR, attributes such as the subscriber's account ID; and the subscriber's service code; the PCRF may perform this derivation by, for example, looking up a database record identified by the subscriber's IMSI. The PCRF may also take information from a configuration database including but not limited to authorized QoS parameters relevant to the attributes and derived attributes of the CCR, e.g., maximum allowed ARP, maximum allowed QCI, maximum allowed uplink bitrate, maximum allowed downlink bitrate; and authorized QoS parameters for the specific charging rule including but not limited to maximum allowed ARP, maximum allowed QCI, maximum allowed uplink bitrate and maximum allowed downlink bitrate, etc.

With this information, the PCRF 116 computes the authorized QoS parameters and compares them against the requested QoS. The comparison is based on the QCI, ARP, and bitrates of the requested and authorized QoS. For comparing QCI values, the PCRF 116 primarily uses the "priority" field of the QCI. For comparing ARP values, the PCRF 116 uses the priority level field in conjunction with whether or not the subscriber's resources can pre-empt or be pre-empted by other resources.

Based on the comparison, and the subscriber's bearer control mode, the PCRF 116 uses the requested QoS parameters in the charging rule install AVP to authorize them to either use the authorized QoS parameters in the charging rule install AVP; to "downgrade" the requested QoS into the authorized QoS; or to deny the subscriber admission to the network on the basis that the subscriber is not authorized for the requested QoS.

The PCRF 116 then assigns the maximum bit rate (MBR) and guaranteed maximum bit rate (GMBR) based on the policy authorized QoS. These assigned MBR And GMBR based on policy authorized QoS are then used as the QoS in the charging rule for each PCC rule configuration to install. When done, PCRF 116 adds charging rules to the credit-control answer (CCA) as normal, and the CCA is then sent to PCEF included in the PGW 108 and/or GGSN 120 for enforcement.

Figure 2:
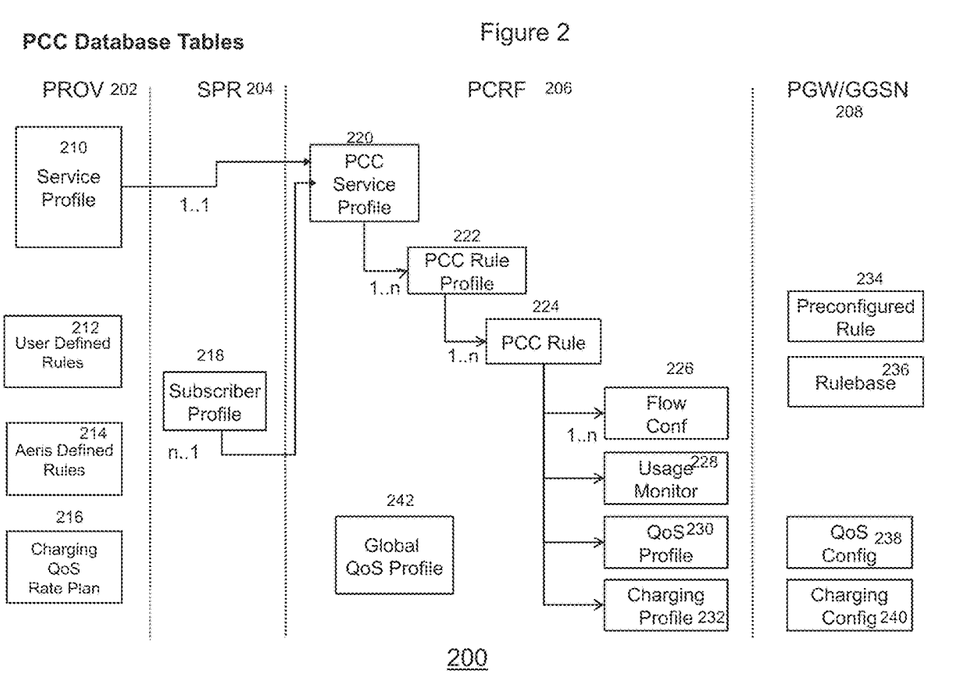
FIG. 2 illustrates an exemplary system 200 and process for automated traffic flow control using quality of service authorization based on type of radio access technology and other data session attributes for one or more devices enabled for connectivity over cellular or wireless network in accordance with an embodiment of the present invention.

FIG. 2 illustrates an exemplary system and process for automated traffic flow control using quality of service authorization based on type of radio access technology for one or more devices enabled for connectivity over cellular or wireless network in accordance with an embodiment of the present invention. In an embodiment, a Policy and Charging Control (PCC) rule 224 consists of: rule name (used as identifier w/Policy and Charging Rules Enforcement Function (PCEF)), service identifier (identify the service or the service component the service data flow relates to), service data flow filter(s) (select the traffic for which the rule applies), precedence (select rule in case more than one rule applies), gate status (allow/block packet uplink/downlink), QoS parameters (bitrates, allocation/retention, etc.), charging key (i.e, rating group), other charging parameters (online, offline, etc.) and monitoring key (for usage monitoring).

The policy entity or PCRF 206 assembles a Policy and Charging Control rule 224 from objects including service_profile 210, rule_profile 222, rule_conf 224, flow_conf 226, qos_profile 230, charging_profile 232, usage_monitor 228 and subs_profile 218, wherein service_profile 210 forms a PCC policy; has one or more rule_profile objects, rule_profile objects form a rule profile; what rules will apply and at what time of day they will apply, rule_conf: the actions (e.g., drop traffic, apply charging & qos & monitoring . . . ) that will be taken on a packet if the flow_conf 226 describes the packet, flow_conf 226: how to identify traffic (based on IP header information: network and user-equipment IP address, network and user-equipment port, protocol, and direction (to the User Equipment, from the User Equipment, or both), qos_profile 230: Quality of Service attributes (maximum bitrate, guaranteed bitrate, qos class, etc.), charging_profile: describes how this service flow (the traffic categorized by the flow_confs 226) gets charged (i.e., when the PCEF processes a subscriber's IP packet, the charging_profile includes information that goes in the charging records sent to the OfCS (Offline Charging System) or OCS (Online Charging System) systems), usage_monitor 228: defines monitoring information for a device's traffic, subs_profile 218: maps a PCC policy to a user equipment (UE). Out of these, generally service_profile 210, PCC service profile 220, charging QoS rate plan 216, QoS profile 230, charging profile 232, QoS profile 230, QoS configuration 238 and Global QoS profile 242 are used for automated traffic flow control using radio access technology type-based quality of service authorization for one or more devices enabled for connectivity over cellular or wireless network.

Table 1 illustrates the fields in an exemplary QoS Profile, and the corresponding fields in an exemplary Global QoS Profile used by the PCRF. There may be other fields in addition to those listed herein.

TABLE 1

| QoS Profile Field | Description | Global QoS Field |
|---|---|---|
| N/A | A unique identifier to identify this row | id |
| N/A | The accountId this Global QoS Profile should apply to, or a wildcard for "all" | accountId |

TABLE 1-continued

| QoS Profile Field | Description | Global QoS Field |
|---|---|---|
| N/A | If the accountId matches, the score to be used in selecting a Global QoS Profile | accountIdScore |
| N/A | The serviceCode this Global QoS Profile should apply to, or a wildcard for "all" | serviceCode |
| N/A | If the serviceCode matches, the score to be used in selecting a Global QoS Profile | serviceCodeScore |
| N/A | The visited Mobile Country Code this Global QoS Profile should apply to, or a wildcard for "all" | visitedMcc |
| N/A | If the visitedMcc matches, the score to be used in selecting a Global QoS Profile | visitedMccScore |
| N/A | The visited Mobile Network Code (combined with Mobile Country Code for disambiguation) that this Global QoS Profile should apply to, or a wildcard for "all" | visitedMccMnc |
| N/A | If the visitedMccMnc matches, the score to be used in selecting a Global QoS Profile | visitedMccMncScore |
| N/A | The Radio Access Technology Type this Global QoS Profile should apply to, or a wildcard for "all" | ratType |
| N/A | If the ratType matches, the score to be used in selecting a Global QoS Profile | ratTypeScore |
| N/A | An expression determining what times of day this Global QoS Profile should apply during, or a wildcard for "all" | timeOfDay |
| N/A | If the timeOfDay matches, the score to be used in selecting a Global QoS Profile | timeOfDayScore |
| N/A | An expression determining the serving Access Point Name (APN) this Global QoS Profile should apply during, or a wildcard for "all" | apn |
| N/A | If the APN matches, the score to be used in selecting a Global QoS Profile | apnScore |
| Qci | The "most expensive" QCI that the PCRF will authorize | bestQci |
| arpPl | The "most expensive" ARP PL that the PCRF will authorize | bestArpPl |
| arpPci | Whether or not the PCRF will authorize a subscriber to have pre-emption capability | authorizePreEmptionCapability |
| arpPvi | Whether or not the PCRF will authorize a subscriber to be vulnerable to pre-emption | authorizePreEmptionInvulnerability |
| mbrUl | The highest uplink bitrate the PCRF will authorize | maxMbrUl |
| mbrDl | The highest downlink bitrate the PCRF with authorize | maxMbrDl |
| gbrUl | The highest uplink guaranteed bitrate the PCRF will authorize | maxGbrUl |
| gbrDl | The highest downlink guaranteed bitrate the PCRF will authorize | maxGbrDl |

Figure 3:
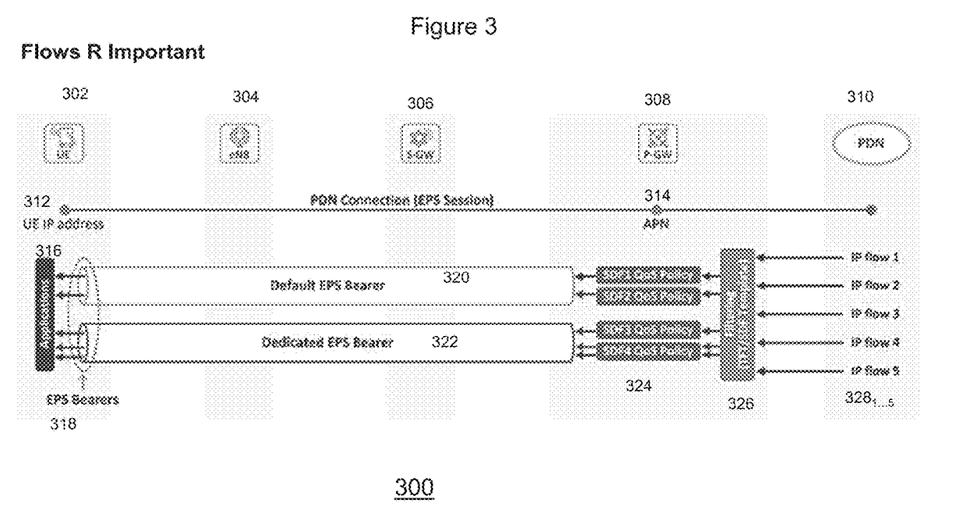
FIG. 3 illustrates an exemplary system 300 and process for automated traffic flow control using quality of service authorization based on type of radio access technology and other data session attributes for one or more devices enabled for connectivity over cellular or wireless network in accordance with an embodiment of the present invention.

FIG. 3 illustrates an exemplary system and process for automated traffic flow control using quality of service authorization based on type of radio access technology for one or more devices enabled for connectivity over cellular or wireless network in accordance with an embodiment of the present invention. In an embodiment, traffic is matched for categorization, assigned a Quality of Service (QoS) policy 324, and delivered to a User Equipment (UE) 302 via an Evolved Packet System (EPS) bearer 318.

Figure 4:
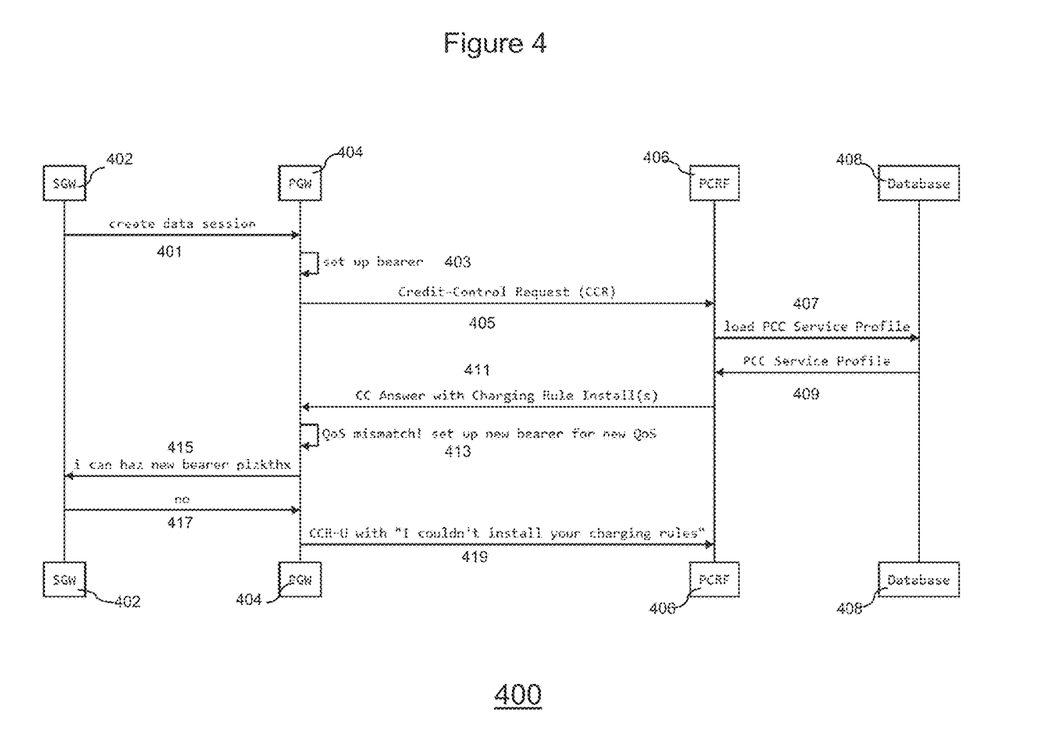
FIG. 4 illustrates a typical exemplary process when a network provider implements a policy and charging rules function (PCRF) that would only authorize a single, static set of Quality-of-Service parameters for any given charging rule.

FIG. 4 illustrates a typical exemplary process when a network provider implements the PCRF that would only authorize a single, static set of QoS parameters for any given charging rule. For example, the network provider typically may implement the PCRF that would only authorize a single, static set of QoS parameters for any given charging rule. A charging rule defines how the Policy and Charging Enforcement Function (PCEF) should handle a subscriber's traffic that matches a set of Internet Protocol filter rules, for example, dropping packets sent to a certain port, or applying a high-priority quality of service to packets sent from or to an ISP's streaming video service etc. The set of QoS parameters the PCRF assigns to each charging rule is configured in advance, but cannot be modified at run-time to account for different subscriber access scenarios.

This may be problematic for cellular devices on radio access technology (RAT) types that do not allow the creation of alternate bearers. If the QoS parameters authorized by the PCRF do not match the QoS parameters associated with the subscriber's bearer, and the cellular network does not support having the network control the subscriber's bearer(s), bad things may happen such as not installing the charging rules and hence the PGW may not control the subscriber's traffic as intended by the network operator. FIG. 4 illustrates a process when cellular devices on radio access technology (RAT) types that did not allow the creation of alternate bearers. For example, the cellular device requests PGW 404 to create a data session via step 401 through SGW 402. PGW 404 sets up bearer via step 403 and sends a credit control request (CCR) to PCRF 406 via step 405. PCRF 406 then looks up PCC service profile in database 408 via steps 407 and 409 and sends credit control answer (CCA) with charging rule install(s) to PGW 404 via step 411. If there is mismatch between the requested QoS and available/authorized QoS, PGW 404 sets up new bearer for new QoS via step 413 and sends a request to have a new bearer to SGW 402 via step 415, which may respond by saying no via step 417. PGW 404 then responds to PCRF 406 as CCR-U with a "no", for example, "I couldn't install your charging rules" via step 419.

For certain features offered by the network operator such as "Connection Lock", described in co-pending U.S. application Ser. No. 16/879,087, entitled "TRAFFIC FLOW CONTROL USING DOMAIN NAME", involving automated traffic flow control using domain names for one or more devices enabled for connectivity over cellular or wireless networks to properly work, the PCRF's charging rules must be installed in the Packet Gateway (PGW), for example, where the network provider's PGW functions as a Policy and Charging Enforcement Function (PCEF).

Figure 5A:
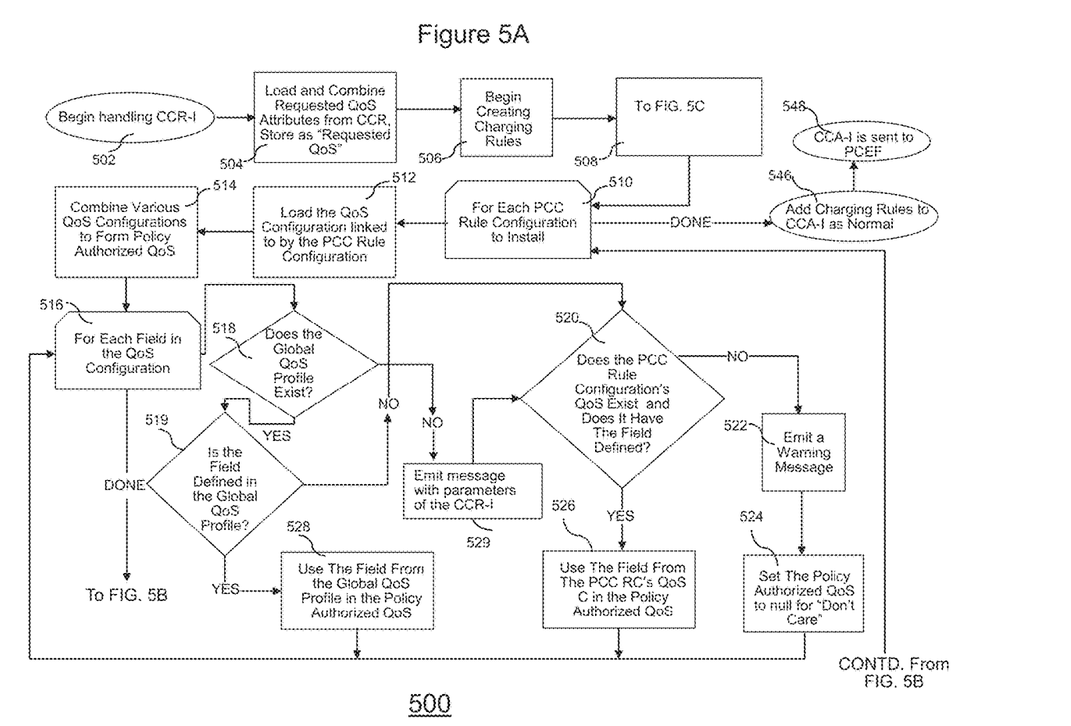
FIGS. 5A, 5B and 5C illustrate an exemplary system 500 and process for automated traffic flow control using quality of service authorization based on type of radio access technology and other data session attributes for one or more devices enabled for connectivity over cellular or wireless network in accordance with an embodiment of the present invention.
Figure 5B:
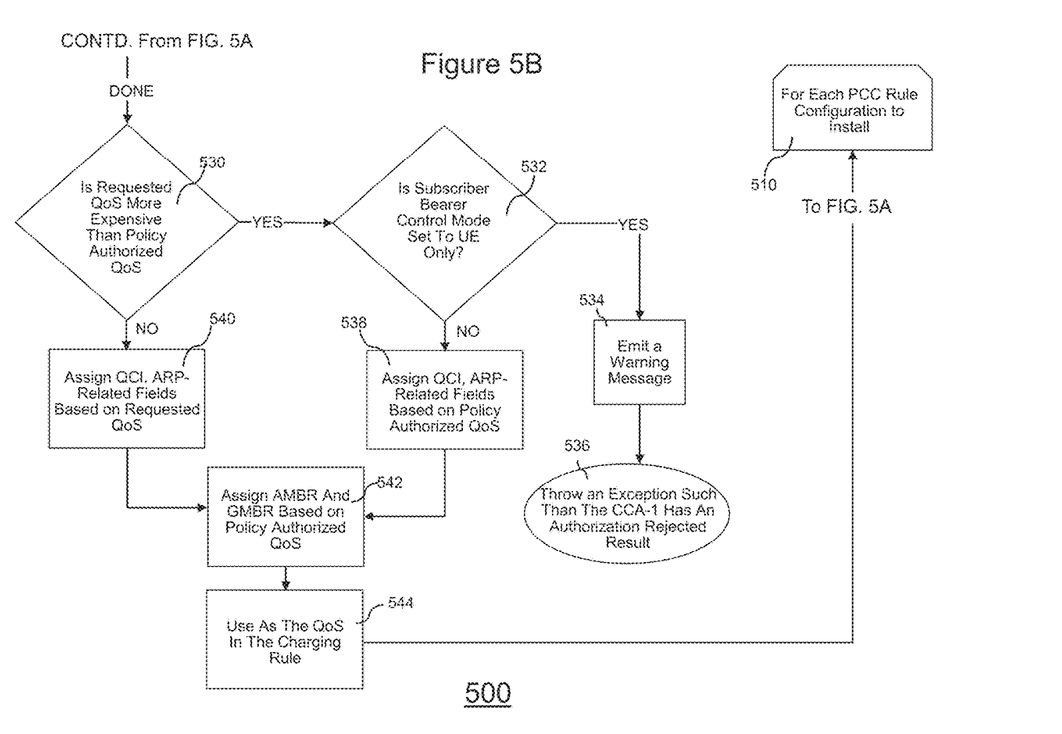
Figure 5C:
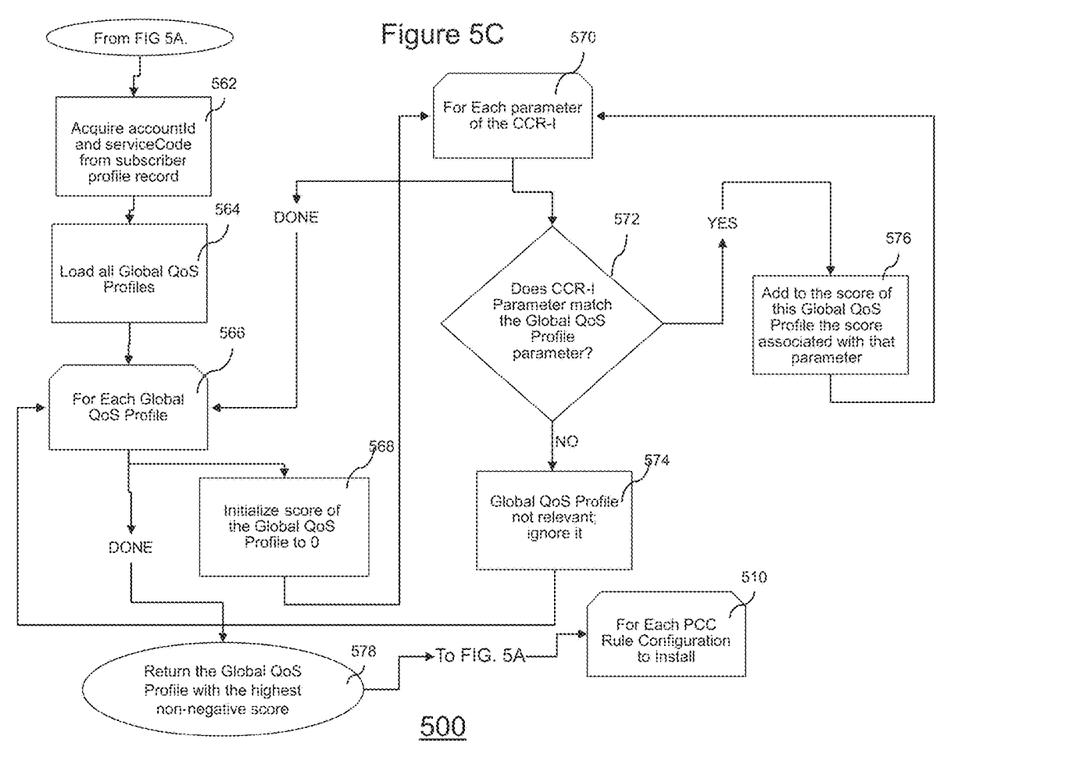

FIGS. 5A, 5B, and 5C illustrate an exemplary system and process for automated traffic flow control using quality of service (QoS) authorization based on type of radio access technology (RAT) and other data session attributes for one or more devices enabled for connectivity over cellular or wireless network in accordance with an embodiment of the present invention. In an embodiment, a naive implementation of a dynamic QoS authorization—such that the authorized QoS does not cause unnecessary bearer creation—would be to use the requested QoS parameters in each charging rule install AVP. However, this could consume a prohibitive amount of resources in network provider's equipment if subscriber devices request, e.g., guaranteed bitrates.

The network provider therefore may authorize QoS parameters in order to constrain a subscriber's cellular data session to a certain level of resource utilization, and in order to match the QoS parameters that their cellular roaming partners approve. To enable traffic control through use of radio access technology type and other data session attributes-based quality of service, as input from Credit Control Requests (CCR), the PCRF may take any one or more of the following pieces of information: Radio Access Technology (RAT) type, and any one or more of other data session attributes including but not limited to: visited Public Land Mobile Network (PLMN); International Mobile Subscriber Identifier (IMSI); the subscriber's Bearer Control Mode; and any one or more of the requested QoS parameters Allocation and Retention Priority (ARP) including but not limited to Quality of Service Class Identifier (QCI); maximum uplink bitrate; maximum downlink bitrate. The PCRF may derive, from pieces of information from the CCR, attributes such as the subscriber's account ID; and the subscriber's service code; the PCRF may perform this derivation by, for example, looking up a database record identified by the subscriber's IMSI. The PCRF may also take any one or more of the following pieces of information from a configuration database such as authorized QoS parameters relevant to the attributes and derived attributes of the CCR, for example: maximum allowed ARP, maximum allowed QCI, maximum allowed uplink bitrate and maximum allowed downlink bitrate. Authorized QoS parameters for the specific charging rule may include any one or more of: maximum allowed ARP; maximum allowed QCI; maximum allowed uplink bitrate; and maximum allowed downlink bitrate.

Table 1 illustrates the fields of an exemplary Global QoS Profile introduced by this invention, and their corresponding fields in an exemplary QoS Profile. The Global QoS Profiles are stored in a database table. The PCRF selects an entry in that table via a matching process involving attributes of the subscriber and the CCR-I in question and applies the selected entry to all PCC policy decisions.

With this information, the PCRF combines the authorized QoS parameters and compares them against the requested QoS. The comparison is based on the QCI, ARP, and bitrates of the requested and authorized QoS. For comparing QCI values, the PCRF primarily uses the "priority" field of the QCI. For comparing ARP values, the PCRF uses the priority level field in conjunction with whether or not the subscriber's resources can pre-empt or be pre-empted by other resources. Based on the comparison, and the subscriber's Bearer Control Mode, the PCRF will: 1. Use the requested QoS parameters in the Charging Rule Install AVP to authorize them; 2. Use the authorized QoS parameters in the Charging Rule Install AVP to "downgrade" the requested QoS into the authorized QoS; or 3. Deny the subscriber admission to the network on the basis that the subscriber is not authorized for the requested QoS.

This solution allows the network provider PCRF to constrain QoS authorized for subscribers while giving network operators the flexibility to adjust for differing Radio Access Technologies and other data session attributes such as but not limited to visited countries, visited PLMNs, customer accounts, service profiles within a customer account, time of day of access, and serving APN, etc. This solution may also allow network operators to provide other data session attributes, for example, user time zone, etc., to the evaluation criteria which are not described here. It may also make the network provider a little bit better at offering differentiated services and may allow certain features offered by the network provider such as the "Connection Lock" feature described above to work across different Radio Access Technologies.

FIGS. 5A, 5B, and 5C illustrate an exemplary system and process for automated traffic flow control using quality of service (QoS) authorization based on type of radio access technology and other data session attributes for one or more devices enabled for connectivity over cellular or wireless network in accordance with an embodiment of the present invention. In an embodiment, the PCRF illustrated in the system 100 described in FIG. 1 begins handling credit control request (CCR-I) via step 502. The PCRF loads and combines requested QoS attributes from CCR and stores as "Requested QoS" via step 504.

The PCRF begins creating charging rules via step 506 and loads the Global QoS profile based on the data session attributes of the CCR via step 508, and for each PCC rule configuration to install via step 510, loads the QoS configuration linked to by the PCC rule configuration via step 512.

FIG. 5C illustrates a process for determining the most applicable Quality of Service for a subscriber given the data session attributes or parameters of the CCR-I. In accordance with this invention, it is executed by the PCRF when determining what Quality of Service (QoS) parameters to authorize for a subscriber's data session. The PCRF determines via step 562 the account ID and service code of the subscriber from the subscriber profile record and considers these to be parameters of the CCR-I.

The PCRF loads via step 564 all Global QoS Profiles from, for example, a database, and iterates through them via step 566. Via step 568, the process initializes the score for the current Global QoS Profile to zero (0). Via steps 570 and 572, the process compares every data session attribute or parameter of the CCR-I with the value of the Global QoS Profile (for example, comparing the visited PLMN of the CCR-I with the visited PLMN of the Global QoS profile). The data session attributes, or parameters include, but are not limited to, the visited PLMN, the time of day of establishment of the data session, the RAT Type used, and the APN used by the subscriber, etc.

The match may be performed by an exact match, for example, matching the MCC of a visited PLMN against the digits "311", or by comparing against a designated wildcard value, for example, if the Global QoS Profile's APN parameter/attribute has the value of "*", it would successfully match against any value of the CCR-I's APN parameter. If the two parameters/attributes do not match, the process ignores the current Global QoS profile and continues to the next Global QoS Profile via step 574. If the data session attributes/parameters do match, the process adds the score of the data session attribute/parameter specified in the Global QoS Profile to the score stored for the Global QoS Profile via step 576.

Once all such Global QoS Profiles and data session attributes/parameters have been considered, the most applicable Global QoS Profile is the one with the highest score, as determined by step 578. In the event of a tie, the PCRF chooses the Global QoS Profile with the smallest unique identifier and emits a log message warning of a tie.

The PCRF then combines various QoS configurations to form the policy authorized QoS via step 514 for each field in the QoS configuration via step 516 by checking if the Global QoS profile matching the data session attributes/parameters provided by the credit control request (CCR) exists via step 518. If it exists, the PCRF checks to see if the field is defined in that QoS profile via step 519. If it is defined, the PCRF uses the field from QoS profile for the policy authorized QoS via step 528. If the Global QoS profile (element 230 illustrated in FIG. 2) does not exist and/or the field is not defined, the PCRF checks if the PCC rule configuration's QoS exists and does it have the field defined via step 520. If yes, the PCRF uses the field from the policy and charging control (PCC) rule configuration's (RC's) (element 224 illustrated in FIG. 2) QoS profile (element 230 illustrated in FIG. 2) in the policy authorized QoS via step 522. If not, The PCRF emits a warning message and sets the policy authorized QoS to null for "Don't Care" via step 524.

If the Global QoS Profile does not exist, the PCRF emits a message describing the data session attributes/parameters of the CCR-I via step 529; an automated system may consume this message and show it to network operators; the network operators may elect to create a Global QoS Profile matching the message's data session attributes/parameters in order to more fully define the QoS authorization behavior of the PCRF.

Once this is performed for all fields in the QoS Configuration, the PCRF checks if the requested QoS more expensive than policy authorized QoS via step 530. If it is, the PCRF checks if the subscriber bearer control mode set to UE only via step 532. If it is, the PCRF emits a warning message via step 534 and throws an exception such that the response to the initial CCR (CCA-I) has an authorization rejected result via step 536. If not, the PCRF assigns quality of service class indicator (QCI) and allocation and retention priority (ARP)-related fields based on the policy authorized QoS via step 538.

If the requested QoS is not more expensive than policy authorized QoS, the PCRF assigns QCI and ARP-related fields based on the requested QoS via step 540. The PCRF then assigns maximum bit rate (MBR) and guaranteed maximum bit rate (GMBR) based on policy authorized QoS via step 542.

These assigned MBR and GMBR based on policy authorized QoS are then used as the QoS in the charging rule for each PCC rule configuration via step 544 to install as shown by element 510 in FIG. 5A. When done, PCRF adds charging rules to CCA-I as normal via step 546, the CCA-I is then sent to PCEF for enforcement via step 548.

A person skilled in the art may understand that although a number of examples of filters and/or attributes for creating groups are provided herein, various other attributes may be used for creation of groups based on various attributes.

Figure 6:
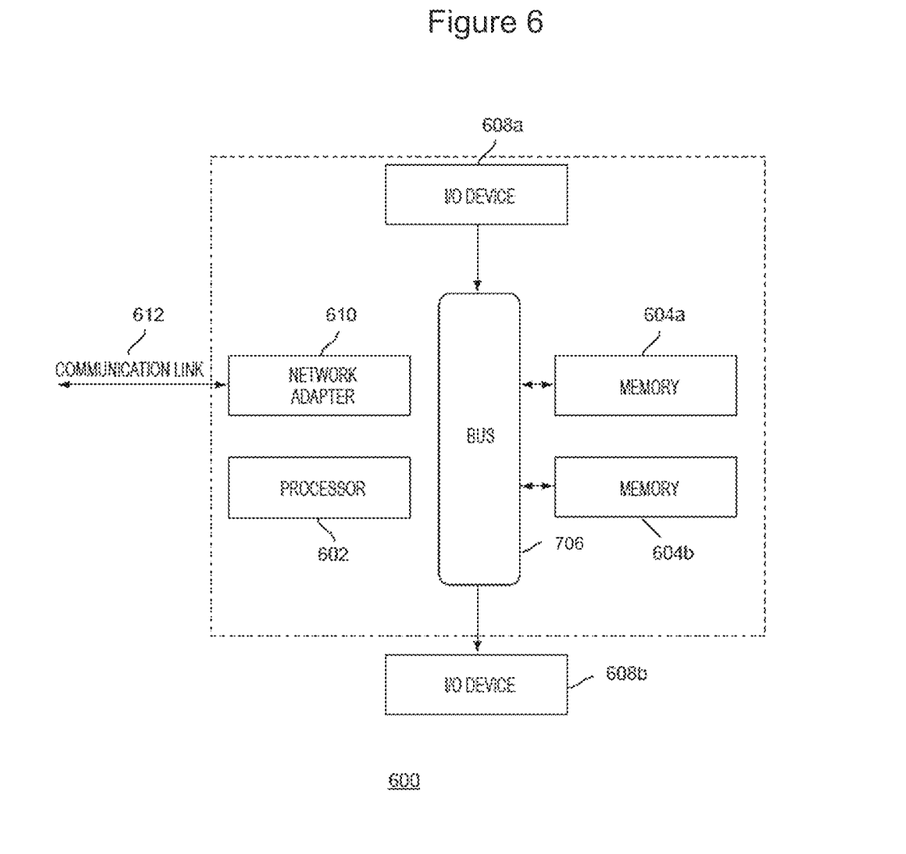
FIG. 6 illustrates a data processing system 600 suitable for storing the computer program product and/or executing program code relating to automated traffic flow control using quality of service authorization based on type of radio access technology and other data session attributes for one or more

FIG. 6 illustrates a data processing system 600 suitable for storing the computer program product and/or executing program code in accordance with an embodiment of the present invention. The data processing system 600 includes a processor 602 coupled to memory elements 604*a-b* through a system bus 606. In an embodiment, the data processing system 600 may include more than one processor and each processor may be coupled directly or indirectly to one or more memory elements through a system bus.

Memory elements 604*a-b* can include local memory employed during actual execution of the program code, bulk storage, and cache memories that provide temporary storage of at least some program code in order to reduce the number of times the code must be retrieved from bulk storage during execution. As shown, input/output or I/O devices 608*a-b* (including, but not limited to, keyboards, displays, pointing devices, etc.) are coupled to the data processing system 600. I/O devices 608*a-b* may be coupled to the data processing system 600 directly or indirectly through intervening I/O controllers (not shown).

In FIG. 6, a network adapter 610 is coupled to the data processing system 602 to enable data processing system 602 to become coupled to other data processing systems or remote printers or storage devices through communication link 612. Communication link 612 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk—read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, 5G, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for automated traffic flow control using quality of service authorization based on type of radio access technology and other data session attributes for one or more devices enabled for connectivity comprises:
   receiving a credit control request for the one or more devices from a subscriber;
   receiving quality of service (QoS) parameters authorized for the one or more devices for the subscriber from a configuration database;
   combining the authorized QoS parameters for the subscriber from a configuration database and attributes derived from the credit control request; wherein the derived attributes from the credit control request include any of a maximum allowed Allocation and Retention Policy (ARP), maximum allowed Quality of Service Class Identifier (QCI), maximum allowed uplink bitrate, maximum allowed downlink bitrate or a combination thereof;
   comparing them against the requested QoS by the subscriber; and updating charging rules for the subscriber as an answer to the credit control request.

2. The method of claim 1, wherein the credit control request includes one or more of: radio access technology (RAT) type, visited public land mobile network (PLMN), international mobile subscriber identifier (IMSI), subscriber's bearer control mode, time of day that the OCR was issued and requested QoS parameters.

3. The method of claim 2, wherein the requested QoS parameters include one or more of: allocation and retention priority (ARP), quality of service class identifier (QCI), maximum uplink bitrate and maximum downlink bitrate.

4. The method of claim 1, wherein the quality of service (QoS) parameters authorized for the one or more devices includes authorized QoS parameters for the RAT type and authorized QoS parameters for a specific charging rule.

5. The method of claim 4, wherein the authorized QoS parameters for the RAT type includes any one or more of: maximum allowed ARP, maximum allowed QCI, maximum allowed uplink bitrate and maximum allowed downlink bitrate.

6. The method of claim 4, wherein the authorized QoS parameters for specific charging includes any one or more of: maximum allowed ARP, maximum allowed QCI, maximum allowed uplink bitrate and maximum allowed downlink bitrate.

7. The method of claim 1, wherein the updating charging rules as an answer to the credit control request further includes any one of:
   using the requested QoS parameters in the charging rule to authorize them, using the authorized QoS parameters in the charging rule to "downgrade" the requested QoS into the authorized QoS and denying the subscriber admission to the network on the basis that the subscriber is not authorized for the requested QoS.

8. A system for automated traffic flow control using quality of service authorization based on type of radio access technology and other data session attributes for one or more devices enabled for connectivity over cellular network comprises one or more devices enabled for connectivity,
   a policy and charging rules function software node (PCRF) and a configuration database, wherein the PCRF:
   receives a credit control request for the one or more devices from a subscriber;
   receives quality of service (QoS) parameters authorized for the one or more devices for the subscriber from a configuration database; wherein the derived attributes from the credit control request include any of a maximum allowed Allocation and Retention Policy (ARP), maximum allowed Quality of Service Class Identifier (QCI), maximum allowed uplink bitrate, maximum allowed downlink bitrate or a combination thereof;
   combines the authorized QoS parameters for the subscriber from a configuration database and attributes derived from the credit control request;
   compares them against the requested QoS by the subscriber; and updates charging rules for the subscriber as an answer to the credit control request.

9. The system of claim 8, wherein the credit control request includes one or more of: radio access technology (RAT) type, visited public land mobile network (PLMN), international mobile subscriber identifier (IMSI), subscriber's bearer control mode, time of day that the CCR was issued and requested QoS parameters.

10. The system of claim 9, wherein the requested QoS parameters include one or more of: allocation and retention priority (ARP), quality of service class identifier (QCI), maximum uplink bitrate and maximum downlink bitrate.

11. The system of claim 8, wherein the quality of service (QoS) parameters authorized for the one or more devices includes authorized QoS parameters for, including but not limited to, the RAT type and visited PLMN, and authorized QoS parameters for a specific charging rule.

12. The system of claim 11, wherein the authorized QoS parameters for the RAT type includes any one or more of: maximum allowed ARP, maximum allowed QCI, maximum allowed uplink bitrate and maximum allowed downlink bitrate.

13. The system of claim 1 wherein the authorized QoS parameters for specific charging includes any one or more of: maximum allowed ARP, maximum allowed QCI, maximum allowed uplink bitrate and maximum allowed downlink bitrate.

14. The system of claim 8, wherein the updating charging rules as an answer to the credit control request further includes any one of:

using the requested QoS parameters in the charging rule to authorize them, using the authorized QoS parameters in the charging rule to "downgrade" the requested QoS into the authorized QoS and denying the subscriber admission to the network on the basis that the subscriber is not authorized for the requested QoS.

15. A non-transitory computer readable medium including computer readable instructions for causing a computer to control an execution of an application for automated traffic flow control using quality of service authorization based on type of radio access technology and other data session attributes for one or more devices enabled for connectivity, comprising:

receiving a credit control request for the one or more devices from a subscriber;

receiving quality of service (QoS) parameters authorized for the one or more devices for the subscriber from a configuration database; wherein the derived attributes from the credit control request include any of a maximum allowed Allocation and Retention Policy (ARP), maximum allowed Quality of Service Class Identifier (QCI), maximum allowed uplink bitrate, maximum allowed downlink bitrate or a combination thereof;

combining the authorized QoS parameters for the subscriber from a configuration database and attributes derived from the credit control request;

comparing them against the requested QoS by the subscriber; and updating charging rules for the subscriber as an answer to the credit control request.

16. The non-transitory computer readable medium of claim 15, wherein the credit control request includes one or more of: radio access technology (RAT) type, visited public land mobile network (PLMN), international mobile subscriber identifier (IMSI), subscriber's bearer control mode, time of day that the CCR was issued and requested QoS parameters.

17. The non-transitory computer readable medium of claim 16, wherein the requested QoS parameters include one or more of: allocation and retention priority (ARP), quality of service class identifier (QCI), maximum uplink bitrate and maximum downlink bitrate.

18. The non-transitory computer readable medium of claim 15, wherein the quality of service (QoS) parameters authorized for the one or more devices includes authorized QoS parameters for the RAT type and authorized QoS parameters for a specific charging rule.

19. The non-transitory computer readable medium of claim 18, wherein the authorized QoS parameters for the RAT type includes any one or more of: maximum allowed ARP, maximum allowed QCI, maximum allowed uplink bitrate and maximum allowed downlink bitrate.

20. The non-transitory computer readable medium of claim 18, wherein the authorized QoS parameters for specific charging includes any one or more of: maximum allowed ARP, maximum allowed QCI, maximum allowed uplink bitrate and maximum allowed downlink bitrate.

21. The non-transitory computer readable medium of claim 15, wherein the updating charging rules as an answer to the credit control request further includes any one of: using the requested QoS parameters in the charging rule to authorize them, using the authorized QoS parameters in the charging rule to "downgrade" the requested QoS into the authorized QoS and denying the subscriber admission to the network on the basis that the subscriber is not authorized for the requested QoS.

* * * * *